US009988040B2

(12) United States Patent
Verdier et al.

(10) Patent No.: US 9,988,040 B2
(45) Date of Patent: Jun. 5, 2018

(54) METHOD FOR PREVENTING AN ENGINE FROM STALLING USING AN ESTIMATE OF THE ROTATABLE SPEED OF SAID ENGINE

(71) Applicants: CONTINENTAL AUTOMOTIVE FRANCE, Toulouse (FR);
CONTINENTAL AUTOMOTIVE GMBH, Hannover (DE)

(72) Inventors: Damien Verdier, Toulouse (FR);
Benjamin Marconato, Toulouse (FR);
Jerome Lachaize, Toulouse (FR)

(73) Assignees: CONTINENTAL AUTOMOTIVE FRANCE, Toulouse (FR);
CONTINENTAL AUTOMOTIVE GMBH, Hannover (DE)

( * ) Notice: Subject to any disclaimer, the term of this patent is extended or adjusted under 35 U.S.C. 154(b) by 0 days. days.

(21) Appl. No.: 15/033,976

(22) PCT Filed: Oct. 29, 2014

(86) PCT No.: PCT/EP2014/002910
§ 371 (c)(1),
(2) Date: May 3, 2016

(87) PCT Pub. No.: WO2015/062725
PCT Pub. Date: May 7, 2015

(65) Prior Publication Data
US 2016/0264123 A1    Sep. 15, 2016

(30) Foreign Application Priority Data
Nov. 4, 2013   (FR) ..................... 13 60754

(51) Int. Cl.
*F02D 41/04*    (2006.01)
*B60K 6/485*    (2007.10)
(Continued)

(52) U.S. Cl.
CPC ............. *B60W 20/10* (2013.01); *B60K 6/485* (2013.01); *B60W 10/06* (2013.01); *B60W 10/08* (2013.01);
(Continued)

(58) Field of Classification Search
CPC ...... B60W 20/10; B60W 10/06; B60W 10/08; B60W 20/00; B60W 30/1884;
(Continued)

(56) References Cited

U.S. PATENT DOCUMENTS 3,278,909 A    10/1966  Borne et al.
4,300,518 A *  11/1981  Petrie .................... F02P 3/0456
                                                        123/609
(Continued)

FOREIGN PATENT DOCUMENTS

DE          19602302 A1 *  3/1997  .............. F02N 11/10
DE       102007016513 A1 * 10/2008  .............. B60K 6/48
(Continued)

OTHER PUBLICATIONS

International Search Report, dated Feb. 17, 2015, from corresponding PCT application.

*Primary Examiner* — Tuan C To
(74) *Attorney, Agent, or Firm* — Young & Thompson

(57) ABSTRACT

A method prevents the stalling of the engine of a hybrid vehicle (1) equipped with an auxiliary motor (4) and wheels (R1 to R4), pistons (2a to 2d), tank (3), axle (5), drive shaft (6), gearbox (7), connections (8a, 8b), and computer (9). The method uses an estimate of the predicted instantaneous speed of the main engine (2) at its next top dead center, for the purpose of assisting the main engine in a stall situation, via the auxiliary motor which can supply sufficient power to it on a one-off basis to prevent it from stopping. The method defines two levels of instantaneous speed. If the predicted (Continued)

Figure 1:
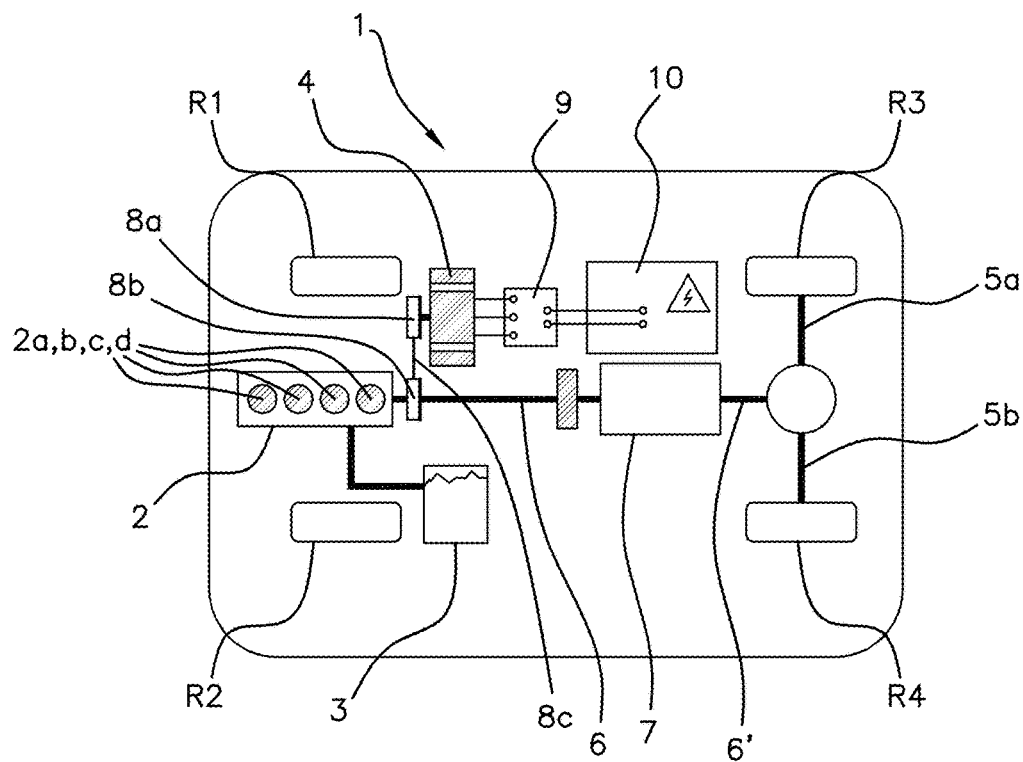

instantaneous speed is located in the intervention zone between the two levels, the auxiliary motor assists the rotation of the main engine to enable it to rotate in the same direction, without stalling.

17 Claims, 2 Drawing Sheets

(51) Int. Cl.
| | |
|---|---|
| *B60W 10/06* | (2006.01) |
| *B60W 10/08* | (2006.01) |
| *B60W 50/00* | (2006.01) |
| *F02D 41/06* | (2006.01) |
| *B60W 20/10* | (2016.01) |
| *B60W 20/00* | (2016.01) |
| *B60W 30/188* | (2012.01) |
| *F02D 29/02* | (2006.01) |

(52) U.S. Cl.
CPC ........ *B60W 20/00* (2013.01); *B60W 30/1884* (2013.01); *B60W 50/0097* (2013.01); *B60W 50/0098* (2013.01); *F02D 29/02* (2013.01); *F02D 41/042* (2013.01); *F02D 41/062* (2013.01); *B60W 2510/0638* (2013.01); *B60W 2510/0685* (2013.01); *B60W 2710/081* (2013.01); *B60Y 2300/56* (2013.01); *Y02T 10/6226* (2013.01); *Y02T 10/84* (2013.01); *Y10S 903/93* (2013.01)

(58) Field of Classification Search
CPC ......... B60W 50/0097; B60W 50/0098; B60W 2510/0638; B60W 2510/06815; B60W 2710/081; B60Y 2300/56; Y02T 10/6226; Y02T 10/84; Y10S 903/93
See application file for complete search history.

(56) References Cited

U.S. PATENT DOCUMENTS

| | | | | | |
|---|---|---|---|---|---|
| 4,962,570 | A | * | 10/1990 | Hosaka | B60K 26/00 123/399 |
| 5,673,676 | A | * | 10/1997 | Mukumoto | F02D 41/2461 123/673 |
| 5,813,390 | A | * | 9/1998 | Anamoto | F02D 41/2445 123/674 |
| 6,655,187 | B1 | * | 12/2003 | Lehner | G01B 7/30 73/1.75 |
| 2001/0004203 | A1 | * | 6/2001 | Matsubara | B60W 10/02 322/16 |
| 2002/0179047 | A1 | * | 12/2002 | Hoang | B60K 6/485 123/350 |
| 2003/0230265 | A1 | * | 12/2003 | Taylor | F01L 1/34 123/90.15 |
| 2005/0079950 | A1 | | 4/2005 | Colvin | |
| 2005/0278109 | A1 | * | 12/2005 | Ando | F02D 41/009 701/112 |
| 2006/0293150 | A1 | * | 12/2006 | Baur | B60W 10/06 477/203 |
| 2007/0204827 | A1 | * | 9/2007 | Kishibata | F02N 11/08 123/179.5 |
| 2007/0283779 | A1 | * | 12/2007 | Hiroi | B60W 30/19 477/80 |
| 2008/0023626 | A1 | | 1/2008 | Watanabe | |
| 2008/0236265 | A1 | | 10/2008 | Dian et al. | |
| 2011/0087390 | A1 | * | 4/2011 | Pandit | B60K 1/00 701/22 |
| 2012/0245781 | A1 | * | 9/2012 | Kanamori | B60K 6/48 701/22 |
| 2012/0327133 | A1 | | 12/2012 | Eguchi | |
| 2013/0035839 | A1 | * | 2/2013 | Otanez | F02N 11/0837 701/102 |
| 2013/0041562 | A1 | * | 2/2013 | Mair | B60W 10/02 701/54 |
| 2013/0104820 | A1 | * | 5/2013 | Watanabe | F01L 1/3442 123/90.15 |
| 2013/0196819 | A1 | * | 8/2013 | Kar | F02D 29/02 477/54 |
| 2013/0289830 | A1 | * | 10/2013 | Kamiya | B60L 7/18 701/48 |
| 2013/0296107 | A1 | * | 11/2013 | Nedorezov | B60W 10/02 477/5 |
| 2013/0297160 | A1 | * | 11/2013 | Kar | B60W 10/06 701/54 |
| 2014/0236441 | A1 | * | 8/2014 | Sato | B60K 23/00 701/64 |
| 2014/0350757 | A1 | * | 11/2014 | Wada | B60K 6/46 701/19 |
| 2015/0047609 | A1 | * | 2/2015 | Kleczewski | F02D 41/0097 123/438 |
| 2015/0166067 | A1 | * | 6/2015 | Rredbrandt | F16D 48/08 701/68 |
| 2015/0260748 | A1 | | 9/2015 | Marconato | |
| 2015/0321670 | A1 | * | 11/2015 | Johansson | B60W 50/0097 701/94 |

FOREIGN PATENT DOCUMENTS

| | | | | |
|---|---|---|---|---|
| EP | 0 326 188 A2 | | 8/1989 | |
| EP | 1 110 800 A2 | | 6/2001 | |
| EP | 1 462 638 A1 | | 9/2004 | |
| FR | 1 258 868 A | | 3/1960 | |
| FR | 2 890 690 A1 | | 3/2007 | |
| FR | 2 995 939 A1 | | 3/2014 | |
| GB | 2 500 920 A | | 10/2013 | |
| JP | 2002310288 A | * | 10/2002 | |
| JP | 2004347063 A | * | 12/2004 | |
| JP | 2005180534 A | * | 7/2005 | ......... F16H 61/143 |
| JP | 2009044778 A | * | 2/2009 | ......... B63H 21/14 |
| JP | 2011/140938 A | | 7/2011 | |
| WO | 2007/028584 A1 | | 3/2007 | |
| WO | 2014/044353 A1 | | 3/2014 | |

\* cited by examiner

1

METHOD FOR PREVENTING AN ENGINE FROM STALLING USING AN ESTIMATE OF THE ROTATABLE SPEED OF SAID ENGINE

BACKGROUND OF THE INVENTION

Field of the Invention

The invention relates to a method for preventing an engine from stalling. More specifically, the purpose of this stall prevention is to assist an internal combustion engine, which is subject to stalling, by using an auxiliary motor capable of supplying sufficient power to it on a one-off basis to prevent stalling.

DESCRIPTION OF THE RELATED ART

The invention lies within the general context of the technical control of the equipment of a vehicle provided for the comfort and safety of the driver and his passengers.

For example, there is a known way of monitoring the rotation of internal combustion engines by using, for example, "Stop and Start" systems, fitted to save fuel during periods in which the vehicle is temporarily stationary, at traffic lights for example. In particular, a knowledge of the exact position of the engine when stationary enables it to be started more quickly in the "Start" phase of the system.

A further step in the technical control of the equipment of the vehicle is that of providing assistance to the engine when there is a risk of its stalling for various reasons, for example starting in first or second gear with insufficient power, hill starting, impact of the vehicle against a sidewalk, etc.

In this field of stall prevention by assistance from an auxiliary motor, it is known, from patent document EP 1 110 800 for example, that the rotation of the engine can be monitored by analyzing two parameters, namely the state of clutch engagement (based on the relation between the vehicle speed and the engine speed) and the degree of opening of the throttle valve of the engine. In this case, stall prevention is provided by assistance from an electric motor.

Another patent document, EP 0 326 188, describes the monitoring of the rotation of an engine using an electronic system controlling numerous parameters of the engine. Stall prevention is provided by reducing the engine load by temporarily stopping the air conditioning, the interior lighting, or the battery charging.

However, in these monitoring and assistance systems, the average speed (the speed shown on the revolution counter of the vehicle) is monitored to prevent predicted stalling when this speed decreases. The recognition of this decrease usually takes place too slowly, making it impossible to prevent the stalling of the engine. In these conditions, the current monitoring systems detect a critical reduction of the engine speed within a time interval which is usually insufficient to make the assistance provided by the electric motor effective.

The invention is intended to overcome these problems by defining conditions for early intervention by the auxiliary assistance motor and more precise monitoring of the speed of the main engine to be assisted, while allowing for the time required for the intervention of the auxiliary assistance motor.

More precisely, the present invention proposes a method for preventing the stalling of a main engine of a vehicle. Said main engine is of the internal combustion type, and comprises pistons which each perform a cycle in a cylinder to rotate a crankshaft which drives a main drive shaft. The vehicle also comprises an auxiliary electric motor for assisting the main engine by means of two pulleys and a drive belt, a gear box, means for measuring the rotation speed of the main engine, and means for controlling the auxiliary motor, comprising calculation and information storage tools.

According to the invention, the stall prevention method comprises the following steps:
- an estimate of the rotation speed of said main engine for a predefined subsequent angular position is used, the rotation speed of the main engine being estimated on the basis of a prediction of the instantaneous rotation speed of the crankshaft, hereafter referred to as the predicted instantaneous speed;
- an intervention zone is defined between two minimum speeds of the crankshaft at said predefined subsequent angular position, namely a higher minimum speed above which the engine is considered not to be in a stall situation, and a lower minimum speed, below which the stalling of the main engine is considered to be inevitable;
- if the predicted instantaneous speed for the predefined subsequent position is in the intervention zone, in which there is a risk of stalling of the engine, or below this intervention zone, said auxiliary motor is started as long as said predicted instantaneous speed is below a predefined threshold, to assist the rotation of the main engine so that the latter can continue to rotate in the same direction.

In these conditions, if the predicted instantaneous speed for the predefined subsequent position is in the intervention zone, the auxiliary motor is made to rotate at an instant which is early enough for this action to prevent the stalling of the main engine. If the instantaneous speed is below the intervention zone, the auxiliary motor can be started as soon as the calculation of the predicted instantaneous speed is completed, in order to optimize the chances of preventing stalling.

Preferably, the auxiliary motor assists the rotation of the main engine for as long as said rotation speed of the main engine is below a deceleration speed used as a predefined threshold.

According to preferred embodiments:
- the predefined subsequent angular position is that of the crankshaft at the next top dead center (hereafter referred to as the TDC) of each piston;
- the main engine is considered not to be in a stall situation at a given instant if its predicted instantaneous speed for the next TDC is greater than the higher minimum speed;
- if the predicted instantaneous speed at the next TDC, referred to hereafter as the first TDC, lies within the intervention zone between the higher minimum speed and the lower minimum speed, it is considered that the main engine must stall between the TDC called the second TDC, which immediately follows the first TDC, and before the TDC called the third TDC, which follows the second TDC, if the auxiliary motor is not started;
- if the predicted instantaneous speed at said next TDC is below the intervention zone, it is considered that the main engine must stall before the top dead center immediately following said next TDC, if the auxiliary motor is not started.

An advantageous way of calculating the estimate of the predicted instantaneous speed is described exhaustively in patent application FR 12 58868, which is incorporated by reference in the present text. This estimation comprises the following steps, based on measurements made by an angular rotation sensor associated with the crankshaft for measuring the current angular position of the engine in real time:

- determining the current angular position of the crankshaft and the rotation speed of the main engine for two measurement points of the sensor;
- determining at least one gradient of the rotation speed of the main engine, distinct from the speed gradient between the two measurement points of the preceding step;
- approximating the actual curve of rotation speed of the main engine relative to the current angular position of the crankshaft by means of a second-order polynomial function;
- estimating the predicted instantaneous speed at the predefined subsequent angular position, at the next TDC for example, by applying said polynomial function in relation to the gradients determined previously.

BRIEF DESCRIPTION OF THE DRAWING FIGURES

Figure 2:
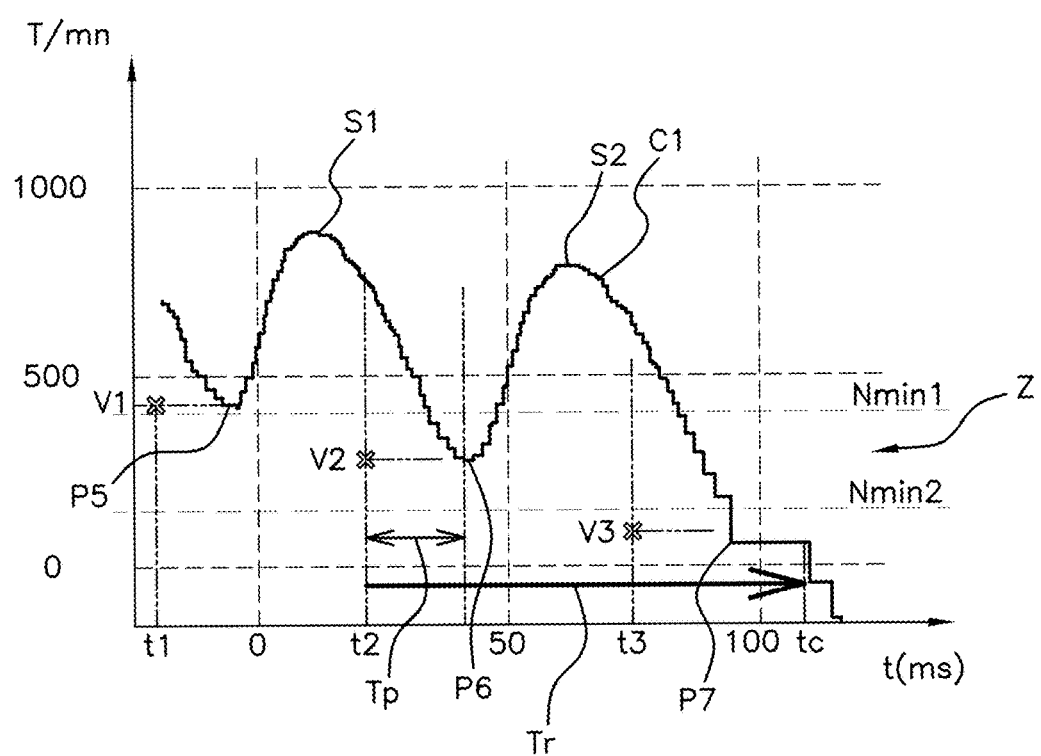

Other data, characteristics and advantages of the present invention will become apparent in the light of the following non-limiting description, relating to the attached drawings, which show, respectively:

in FIG. 1, a schematic view of a hybrid vehicle capable of using the method according to the invention; and in FIG. 2, a diagram showing the variation of the instantaneous speed of an engine measured as a function of time.

The figures relate to the same main internal combustion engine assisted by the same auxiliary electric motor.

The schematic view of FIG. 1 illustrates a hybrid vehicle 1 in which the method according to the invention is used. This vehicle 1 has a main internal combustion engine 2 equipped with four pistons 2a to 2d, a fuel tank 3, and an electrically powered auxiliary motor 4 capable of assisting the main engine 2. For this purpose, the main engine 2 is provided with an auxiliary computer 9 and a battery 10 for storing electrical energy.

The vehicle 1 conventionally has four wheels, including two powered wheels R3 and R4 connected by an axle 5a and 5b to the main engine 2 via a primary drive shaft 6, a gearbox 7 and a secondary drive shaft 6', and two unpowered wheels R1 and R2.

To assist the main engine 2 in case of a requirement signaled by a control and management unit (not shown) of the main engine or by the auxiliary computer 9, the auxiliary motor 4 acts by means of a mechanical coupling system composed of two pulleys 8a and 8b and a drive belt 8c. The pulley 8a is rotated by the auxiliary motor 4, and it communicates its rotary movement via the drive belt 8c to the pulley 8b whose rotary movement is integral with that of the primary drive shaft 6.

In the context of the invention, the calculation of the predicted instantaneous speed for the next top dead center allows enough time for the auxiliary motor 4 to intervene and prevent stalling of the main engine 2. The use of the calculation of the predicted instantaneous speed is shown in FIG. 2, for example according to the teachings of patent application FR 12 58868.

The diagram of FIG. 2 shows a curve C1 of the instantaneous speed of the main engine 2, measured in revolutions per minute, denoted "T/mn", as a function of time "t". This curve is stepped, because of the discontinuous nature of the measurement made by a toothed sensor linked to a target arranged on the crankshaft of the main engine 2.

This diagram also shows two levels of engine speed: an upper level Nmin1 of higher minimum speed, and a lower level Nmin2 of lower minimum speed. Between these two levels Nmin1 and Nmin2, there is defined an intervention zone Z in which the auxiliary motor 4 is started to assist the main engine 2 whose predicted instantaneous speed is too low.

The curve C1 illustrates, in particular, engine cycles with a duration of about 50 ms for a four-cylinder engine, each cycle taking place between two successive TDCs, that is to say between P5 and P6 or between P6 and P7, with reference to FIG. 2.

The engine speeds V1, V2 and V3 are minimal at the respective TDCs P5, P6 and P7, and the engine speeds are maximal in the mid-cycles represented by the points S1 and S2. This curve C1 passes through the intervention zone Z, between the two speed levels Nmin1 and Nmin2, with a reduction of the values of the successive TDCs P5, P6, P7: the first TDC P5 is above the level Nmin1, the second TDC P6 is between the levels Nmin1 and Nmin2, and the third TDC P7 is below the level Nmin2. This decrease indicates a deceleration of the main engine speed.

The three points V1, V2 and V3 correspond to the calculation of the predicted instantaneous speed of the main engine for the three TDC points P5, P6 and P7. The predicted instantaneous speeds V1 to V3 are calculated during each phase of speed decrease, between S1 and P6 for the calculation of V2 and between S2 and P7 for the calculation of V3. In this example, the predicted instantaneous speeds V1, V2 and V3 are calculated at the respective instants t1, t2 and t3.

The predicted speed V1 is located above the intervention zone Z, and does not result in any intervention. However, the predicted speed V2, which is located in the intervention zone Z, then creates a situation in which the auxiliary computer 9 starts the auxiliary motor 4 to assist the main engine 2 in its rotation.

The auxiliary electric motor 4 is provided to assist the main engine in some configurations linked to the predicted instantaneous speeds at the TDCs with respect to the levels Nmin1 and Nmin2.

Thus, the first predicted instantaneous speed V1 at the TDC P5 is located above the level Nmin1, and in these conditions said auxiliary motor 4 does not intervene.

The second predicted instantaneous speed V2 at the next TDC, called P6, is about 400 revolutions per minute. This predicted instantaneous speed is calculated during each phase of speed decrease between the points S1 and P6 (at the time t2 for example), corresponding to a duration of Tp before the TDC P6. At the time t2, a predicted instantaneous speed V2 is then calculated, and is located in the intervention zone Z, between the levels Nmin1 and Nmin2. In this case, the main engine 2 transmits a request for assistance, via its control and management unit (not shown), to the auxiliary computer 9 which starts the auxiliary electric motor 4.

It is considered that the main engine 2 must stall after the next top dead center P6 and before the point P7 which immediately follows it, if its predicted instantaneous speed for the next top dead center lies within this intervention zone Z, unless assistance is provided to the main engine 2 by the auxiliary motor 4. Because of the prediction of the instantaneous speed, the possible reaction time to enable the auxiliary motor 4 to assist the main engine 2 is Tr, up to the instant tc, which substantially corresponds to stalling, as explained below, and this time is the sum of the time Tp and a practically whole cycle of the curve C1 between the points P6 and P7.

With assistance to the main engine 2 from the instant t2, the instantaneous speed of this main engine increases. Without assistance, the instantaneous speed at the next TDC, in this case the point P7, falls to an even lower level, of about 100 revolutions per minute. The curve then intersects the zero speed line, and passes through negative speed values, corresponding to an engine rotating in a direction opposed to the direction of normal operation, before stopping. This configuration typically corresponds to a stall configuration.

The calculation of the predicted instantaneous speed V3 yields a speed below the speed Nmin2. In this case, it is considered that the main engine 2 must stall before the top dead center P7, leaving the auxiliary motor 4 with little time to assist the main engine 2. In this case, the auxiliary motor 4 simply increases the speed of the main engine 2 so that the next top dead center returns to a point above the speed Nmin2.

In order to illustrate the benefit of using the predicted instantaneous speeds according to the invention, Table I below shows comparisons, in different stall situations (column headed "Scenario"), between the predicted instantaneous speed (column headed "Vestim"), the measured actual instantaneous speed (column headed "Vreal") and the average speed (column N) of the main engine (these speeds are expressed in revolutions per minute and correspond to the same TDC on the same line of Table I), stall prevention according to the invention not being activated.

The stall scenarios to which Table I relates are as follows: starting while facing a sidewalk (Sidewalk 1G) in first gear, starting on a 20% gradient (Gradient 1G), also in first gear, and stalling (Stall 2G) in second gear.

TABLE I

| Scenario | Step | N | Vestim | Vreal |
|---|---|---|---|---|
| Sidewalk 1G | Step 1 (P6) | 529 | 170 | 192 |
| | Step 2 (P7) | 471 | <0 | <0 |
| Gradient 1G | Step 1 (P6) | 571 | 292 | 237 |
| | Step 2 (P7) | 497 | <0 | <0 |
| Stall 2G | Step 1 (P6) | 791 | 295 | 263 |
| | Step 2 (P7) | 653 | <0 | <0 |

For each scenario, a first line (Step 1) shows the speed values N, Vreal and Vestim at the TDC point P6 preceding the stall, and a second line (Step 2) shows the values of these speeds N, Vreal and Vestim at the next TDC point P7, in the stall situation.

This table provides the following information:
- the average speed N as such, or the deduced tendency of the average speed N between steps 1 and 2 of the same scenario, is an indicator of low relevance because it reveals a deceleration condition when an engine stall has taken place but could be rectified by the auxiliary motor;
- the speeds Vreal and Vestim corresponding to a stall (second steps) are negative while the average speed N is still positive, showing the limits on the use of this average speed for anticipating stalling;
- the predicted instantaneous speed Vestim is close to the measured instantaneous speed Vreal, and therefore provides a valuable estimate;
- in step 1 of each scenario, the speeds Vestim and Vreal, all in the range from 170 to 295 revolutions per minute, correspond to rotation speeds located in the intervention zone Z of the auxiliary electric motor (see FIG. 2). The intervention of this auxiliary motor is therefore started as soon as the value of the predicted instantaneous speed Vestim is calculated, which takes place at the instant t2 in FIG. 2, and which makes it possible to avoid the stalling of the engine.

The invention is not limited to the exemplary embodiments described and represented herein. Thus, in the case of an automatic clutch or automatic control, the prediction according to the invention could activate the opening of the clutch to prevent the main engine from stalling.

It is also possible to calculate the estimate of the predicted instantaneous speed in a different manner, for example by using the calculation described in patent document FR 2 890 690: the estimate of the predicted instantaneous speed can be deduced from the engine position estimated on the basis of a second-order polynomial function, the teeth of the target of a rotation sensor acting as a standard for the measurement of the rotation speed of the target.

The invention claimed is:

1. A method for preventing a main engine (2) of a vehicle (1) from stalling, said main engine (2) being an internal combustion engine and having pistons (2*a* to 2*d*) which each perform a cycle in a cylinder to rotate a crankshaft driving a primary drive shaft (6), the vehicle (1) also comprising an auxiliary electric motor (4) for assisting the main engine (2) by means of two pulleys (8*a*, 8*b*) and a drive belt (8*c*), a gearbox (7), means for measuring the rotation speed of the main engine (2), and means (9) for controlling the auxiliary motor (4), comprising calculation and information storage tools, wherein:
   using an estimate of the rotation speed of said main engine (2) for a predefined subsequent angular position of the crankshaft, said rotation speed of the main engine (2) being estimated on the basis of a prediction of the instantaneous rotation speed (V1, V2, V3) of the crankshaft, called the predicted instantaneous speed;
   defining an intervention zone (Z) between two minimum speeds (Nmin1, Nmin2) of the crankshaft at said predefined subsequent angular position, namely a higher minimum speed (Nmin1) above which the engine is considered not to be in a stall situation, and a lower minimum speed (Nmin2), below which the stalling of the main engine is considered to be inevitable;
   if the predicted instantaneous speed for the predefined subsequent angular position is in the intervention zone (Z), in which there is a risk of stalling of the engine, or below this intervention zone, starting said auxiliary motor (4) as long as said predicted instantaneous speed is below a predefined threshold, to assist the rotation of the main engine (2) so that the latter continues to rotate in the same direction.

2. The stall prevention method as claimed in claim 1, wherein the auxiliary motor (4) assists the rotation of the main engine (2) for as long as said rotation speed of the main engine is below a deceleration speed used as a predefined threshold.

3. The stall prevention method as claimed in claim 1, wherein the predefined subsequent angular position is that of the crankshaft at the next top dead center or TDC (P5, P6, P7) of each piston.

4. The stall prevention method as claimed in claim 1, wherein the main engine (2) is considered not to be in a stall situation at a given instant if its predicted instantaneous speed for the next top dead center is greater than the higher minimum value (Nmin1).

5. The stall prevention method as claimed in claim 3, wherein, if the predicted instantaneous speed at the next TDC, referred to hereafter as the first TDC (P6), lies within the intervention zone (Z) between the higher minimum speed (Nmin1) and the lower minimum speed (Nmin2), it is considered that the main engine (2) must stall between a second TDC (P7), which immediately follows the first TDC (P6), and before a third TDC, which follows the second TDC (P7), if the auxiliary motor (4) is not started.

6. The stall prevention method as claimed in claim 3, wherein, if the predicted instantaneous speed at said next TDC (P7) is below the intervention zone (Z), it is considered that the main engine (2) must stall before the top dead center immediately following said next TDC (P7), if the auxiliary motor (4) is not started.

7. The stall prevention method as claimed in claim 1, wherein the estimate of the predicted instantaneous speed is calculated on the basis of measurements made by an angular rotation sensor associated with the crankshaft for measuring the current angular position of the main engine in real time, and comprises the following steps:
   determining the current angular position of the crankshaft and the rotation speed of the main engine (2) for two measurement points of the sensor;
   determining at least one gradient of the rotation speed of the main engine (2), distinct from the speed gradient between the two measurement points of the preceding step;
   approximating the actual curve of rotation speed of the main engine (2) relative to the current angular position of the crankshaft by means of a second-order polynomial function;
   estimating the predicted instantaneous speed at the predefined subsequent angular position, by applying said polynomial function in relation to the gradients determined previously.

8. The stall prevention method as claimed in claim 2, wherein the predefined subsequent angular position is that of the crankshaft at the next top dead center or TDC (P5, P6, P7) of each piston.

9. The stall prevention method as claimed in claim 2, wherein the main engine (2) is considered not to be in a stall situation at a given instant if its predicted instantaneous speed for the next top dead center is greater than the higher minimum value (Nmin1).

10. The stall prevention method as claimed in claim 3, wherein the main engine (2) is considered not to be in a stall situation at a given instant if its predicted instantaneous speed for the next top dead center is greater than the higher minimum value (Nmin1).

11. The stall prevention method as claimed in claim 8, wherein, if the predicted instantaneous speed at the next TDC, referred to hereafter as the first TDC (P6), lies within the intervention zone (Z) between the higher minimum speed (Nmin1) and the lower minimum speed (Nmin2), it is considered that the main engine (2) must stall between a second TDC (P7), which immediately follows the first TDC (P6), and before a third TDC, which follows the second TDC (P7), if the auxiliary motor (4) is not started.

12. The stall prevention method as claimed in claim 8, wherein, if the predicted instantaneous speed at the next TDC, referred to hereafter as the first TDC (P6), lies within the intervention zone (Z) between the higher minimum speed (Nmin1) and the lower minimum speed (Nmin2), it is considered that the main engine (2) must stall between a second TDC (P7), which immediately follows the first TDC (P6), and before a third TDC, which follows the second TDC (P7), if the auxiliary motor (4) is not started.

13. The stall prevention method as claimed in claim 2, wherein the estimate of the predicted instantaneous speed is calculated on the basis of measurements made by an angular rotation sensor associated with the crankshaft for measuring the current angular position of the main engine in real time, and comprises the following steps:
   determining the current angular position of the crankshaft and the rotation speed of the main engine (2) for two measurement points of the sensor;
   determining at least one gradient of the rotation speed of the main engine (2), distinct from the speed gradient between the two measurement points of the preceding step;
   approximating the actual curve of rotation speed of the main engine (2) relative to the current angular position of the crankshaft by means of a second-order polynomial function;
   estimating the predicted instantaneous speed at the predefined subsequent angular position, by applying said polynomial function in relation to the gradients determined previously.

14. The stall prevention method as claimed in claim 3, wherein the estimate of the predicted instantaneous speed is calculated on the basis of measurements made by an angular rotation sensor associated with the crankshaft for measuring the current angular position of the main engine in real time, and comprises the following steps:
   determining the current angular position of the crankshaft and the rotation speed of the main engine (2) for two measurement points of the sensor;
   determining at least one gradient of the rotation speed of the main engine (2), distinct from the speed gradient between the two measurement points of the preceding step;
   approximating the actual curve of rotation speed of the main engine (2) relative to the current angular position of the crankshaft by means of a second-order polynomial function;
   estimating the predicted instantaneous speed at the predefined subsequent angular position, by applying said polynomial function in relation to the gradients determined previously.

15. The stall prevention method as claimed in claim 4, wherein the estimate of the predicted instantaneous speed is calculated on the basis of measurements made by an angular rotation sensor associated with the crankshaft for measuring the current angular position of the main engine in real time, and comprises the following steps:
   determining the current angular position of the crankshaft and the rotation speed of the main engine (2) for two measurement points of the sensor;
   determining at least one gradient of the rotation speed of the main engine (2), distinct from the speed gradient between the two measurement points of the preceding step;
   approximating the actual curve of rotation speed of the main engine (2) relative to the current angular position of the crankshaft by means of a second-order polynomial function;
   estimating the predicted instantaneous speed at the predefined subsequent angular position, by applying said polynomial function in relation to the gradients determined previously.

16. The stall prevention method as claimed in claim 5, wherein the estimate of the predicted instantaneous speed is calculated on the basis of measurements made by an angular rotation sensor associated with the crankshaft for measuring the current angular position of the main engine in real time, and comprises the following steps:

determining the current angular position of the crankshaft and the rotation speed of the main engine (2) for two measurement points of the sensor;

determining at least one gradient of the rotation speed of the main engine (2), distinct from the speed gradient between the two measurement points of the preceding step;

approximating the actual curve of rotation speed of the main engine (2) relative to the current angular position of the crankshaft by means of a second-order polynomial function;

estimating the predicted instantaneous speed at the predefined subsequent angular position, by applying said polynomial function in relation to the gradients determined previously.

17. The stall prevention method as claimed in claim 6, wherein the estimate of the predicted instantaneous speed is calculated on the basis of measurements made by an angular rotation sensor associated with the crankshaft for measuring the current angular position of the main engine in real time, and comprises the following steps:

determining the current angular position of the crankshaft and the rotation speed of the main engine (2) for two measurement points of the sensor;

determining at least one gradient of the rotation speed of the main engine (2), distinct from the speed gradient between the two measurement points of the; preceding step;

approximating the actual curve of rotation speed of the main engine (2) relative to the current angular position of the crankshaft by means of a second-order polynomial function;

estimating the predicted instantaneous speed at the predefined subsequent angular position, by applying said polynomial function in relation to the gradients determined previously.

\* \* \* \* \*